United States Patent [19]

Nakao

[11] 4,359,984
[45] Nov. 23, 1982

[54] FUEL CONTROL DEVICE FOR DIESEL ENGINE

[76] Inventor: Kiyoharu Nakao, 380-3 Kamikasuya, Isehara-shi, Kanagawa-ken, Japan

[21] Appl. No.: 151,648

[22] Filed: May 20, 1980

[30] Foreign Application Priority Data

May 25, 1979 [JP] Japan .................................. 54/64821
May 25, 1979 [JP] Japan .................................. 54/64822

[51] Int. Cl.³ .......................... F02D 11/10; F02D 1/04
[52] U.S. Cl. ...................................... 123/357; 123/375; 123/497
[58] Field of Search ............... 123/482, 458, 463, 464, 123/357, 358, 375, 497

[56] References Cited

U.S. PATENT DOCUMENTS

| | | | |
|---|---|---|---|
| 2,687,123 | 8/1954 | Parsons | 123/357 |
| 3,026,928 | 3/1962 | Phillips | 123/497 |
| 3,407,793 | 10/1968 | Lanl | 123/357 |
| 3,605,711 | 9/1971 | Fuso | 123/357 |
| 3,643,635 | 2/1972 | Milam | 123/482 |
| 3,665,900 | 5/1972 | Schlimme | 123/357 |
| 3,744,461 | 7/1973 | Davis | 123/357 |
| 3,817,225 | 6/1974 | Priegel | 123/482 |
| 3,889,648 | 6/1975 | Williams | 123/357 |
| 3,935,851 | 2/1976 | Wright | 123/482 |

*Primary Examiner*—Ronald B. Cox

*Attorney, Agent, or Firm*—Spensley, Horn, Jubas & Lubitz

[57] ABSTRACT

A fuel control device for a diesel engine injection system having a motor-driven pump for supplying fuel to the injectors of said engine by driving a fuel pump with a DC motor, means for outputting a first motor-driven pump speed instruction signal according to a throttle position and an engine speed, a function generator for outputting a motor-driven pump armature current setting signal according to an engine speed along a torque curve preset for said engine, a motor speed detecting circuit for detecting an armature current of said motor-driven pump, to output an armature current signal, an integrator for integrating a difference between said armature current setting signal and an actual armature current signal, to output a second motor-driven pump speed instruction signal, and a minimum signal priority circuit for outputting a smaller one of said first and second instruction signals in priority, to control the armature current, whereby the speed of said motor-driven pump is regulated according to an engine speed, for torque regulation of the engine. Other aspects of the invention include an exhaust gas temperature input, coolant temperature, supercharger speed, and acceleration and deceleration inputs. In one embodiment of the invention the electric motor driven pump is driven by the output of an alternator whose excitation coil is controlled by the output of the fuel control circuit.

23 Claims, 20 Drawing Figures

FUEL CONTROL DEVICE FOR DIESEL ENGINE

BACKGROUND OF THE INVENTION

This invention relates to a fuel control device for a diesel engine of direct jet type having unit injectors.

A conventional fuel control device, as shown in FIG. 1, comprises: a gear pump 2; a governor 4; a fly weight 5; a mechanical variable speed (MVS) governor 10; a shut-off valve 13; and an injector 15. The fuel control device has two important control functions. One of the functions is that fuel is delivered, under pressure, out of a fuel tank 1 by means of the gear pump 2, and a fuel pressure is regulated for an engine speed by the governor 4 with the balance of three elements, i.e. the fly weight 5 coupled to the rotation of the engine, a governor spring 6 and the fuel pressure, thereby to determine the acceleration horse power, maximum horse power and maximum torque or torque curve of the engine. The other function is that, irrespective of load applied to the engine, the MVS governor 10 maintains an engine speed constant according to the position of a throttle lever 11 with the balance of a fuel pressure provided by the gear pump 2 and an MVS governor spring 12.

However, the above-described conventional fuel control system is disadvantageous in that it is considerably difficult to change characteristic curves such as a torque curve and a horse power curve as desired because it has various combinations as to the characteristic of the governor spring 6, the size of a button 7, a governor plunger 8, etc.

On the other hand, a diesel engine with a supercharger suffers from the following trouble: When the engine is quickly accelerated, then the speed of the supercharger cannot follow the increasing speed of the engine, as a result of which the amount of suction air becomes insufficient, i.e. the amount of oxygen becomes short, and therefore a large amount of black smoke is discharged from the exhaust pipe.

In order to overcome this difficulty, heretofore a method utilizing the pressure in the intake manifold is employed. That is, when the pressure in the intake manifold is low, the amount of fuel jetted by the injector (hereinafter referred to as "an amount of jet fuel" when applicable) is reduced, to prevent the production of black smoke at the time of acceleration.

However, the method is still disadvantageous in that it is difficult to control the amount of jet fuel with high accuracy, and accordingly it is difficult to positively prevent the production of black smoke.

SUMMARY OF THE INVENTION

Accordingly, a primary object of this invention is to provide a fuel control device for a diesel engine, in which an amount of jet fuel is controlled to economically use the fuel.

Another object of the invention is to provide a fuel control device for a diesel engine, which can prevent the production of black smoke at the time of acceleration.

A further object of the invention is to provide a fuel control device for a diesel engine, in which an amount of jet fuel is regulated according to a suction air pressure or a cooling water temperature to adjust the horse power of the engine, thereby to operate the engine in best conditions at all times.

A still further object of the invention is to provide a fuel control device for a diesel engine, in which an amount of jet fuel is regulated according to the speed of a motor-driven pump.

A particular object of the invention is to provide a fuel control device for a diesel engine, in which a fuel pump is driven through an electromagnetic coupling, to control an amount of jet fuel.

The novel features which are considered characteristics of this invention are set forth in the appended claims. This invention itself, however, together with additional objects and advantages thereof will be best understood from the following detailed description taken in conjunction with the accompanying drawings which illustrate, by way of example only, some preferred embodiments of the invention.

DETAILED DESCRIPTION OF THE INVENTION

Figure 1:
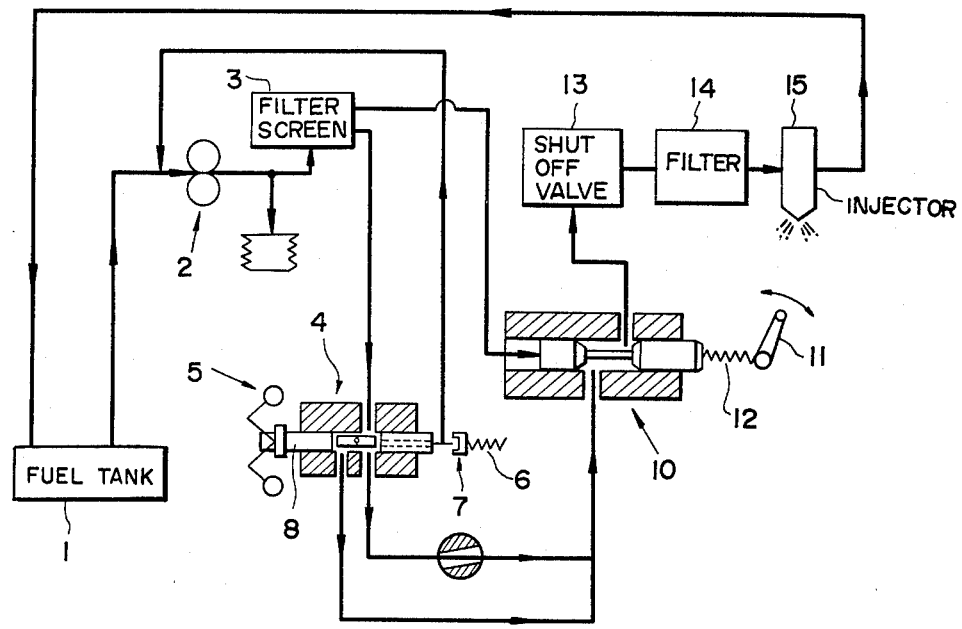
FIG. 1 is an explanatory diagram showing the arrangement of a conventional fuel control device for a diesel engine.
Figure 2:
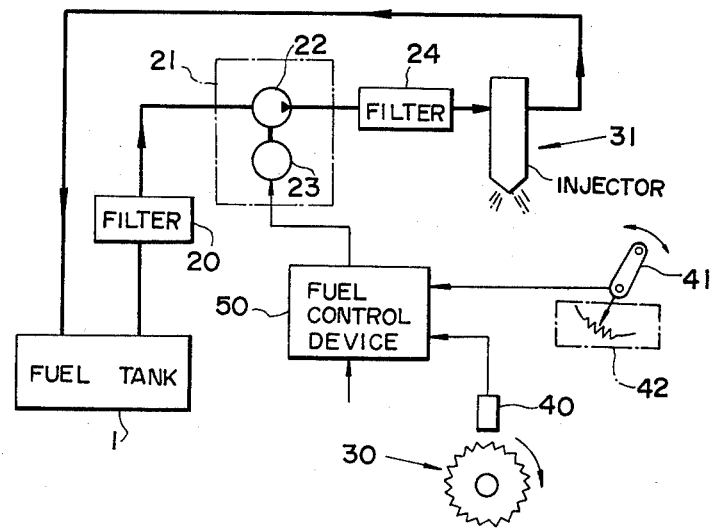
FIG. 2 is an explanatory diagram for a description of the principle of a fuel control device according to this invention.

As conducive to a full understanding of the invention, first the principle of the invention will be described with reference to FIG. 2. The principle is based on the fact that the speed of a diesel engine equipped with a unit injector 31 can be controlled (increased or decreased) by controlling (increasing or decreasing) the pressure of fuel supplied to the injector 31. That is, while the speed of the engine 30 is detected by an engine speed sensor 40, the position of a throttle lever 41 is detected by a throttle sensor 42. According to the detection outputs of these sensors 40 and 42, a control device 50 controls the fuel supply pressure of a motor-driven pump 21, thereby to control the speed of the engine.

Figure 3:
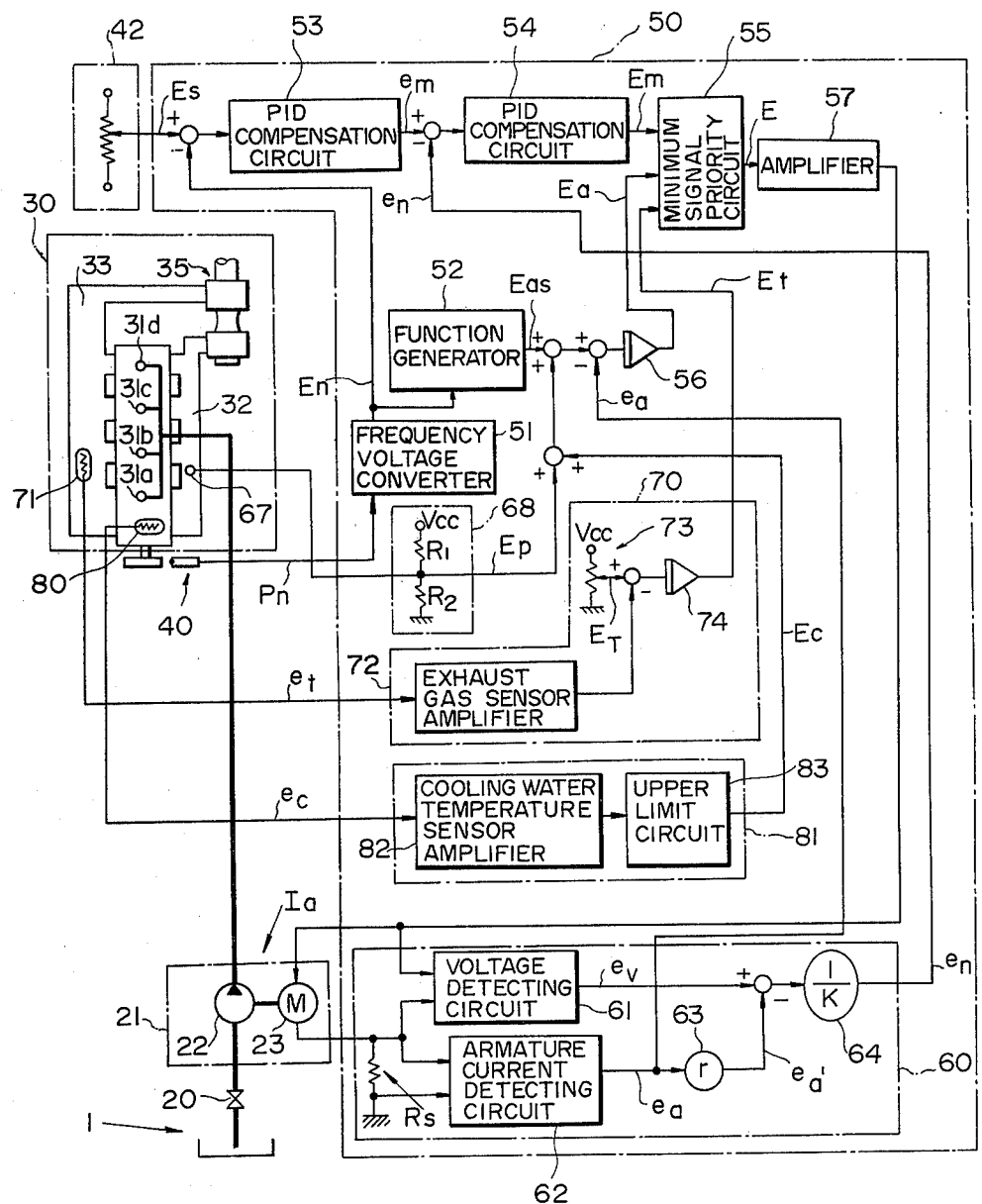
FIG. 3 is a block diagram showing one example of the fuel control device according to the invention.

One example of a fuel control device 50 according to the invention is as shown in FIG. 3. An oil pump 22 in a motor-driven pump 21 is driven by an electric motor 23 to supply fuel from a fuel tank 1 through a filter 20 and a fuel supply pipe to injectors 31a through 31d in a diesel engine 30. The pressure flow rate characteristic of the motor-driven pump 21 is represented by the following equation:

$$PQ = kVIa \ldots \quad (1)$$

where k is the proportional constant, P is the discharge pressure of the pump, Q is the discharge flow rate; V is the terminal voltage of the motor, and Ia is the armature current.

As is clear from the equation (1), the pressure P is in proportion to the armature current Ia. Therefore, if the armature current Ia is detected and limited (controlled), then the pressure P can be limited (controlled). From this fact, it can be understood that the fuel control can be achieved merely by replacing the mechanical "engine speed-fuel pressure characteristic" by a "engine speed-armature current characteristic". The engine speed-armature current characteristic is formed by a function generator 52, and it is necessary that, during the engine speed control, the armature current of the motor 23 in the motor-driven pump 21 does not exceed the set output of the function generator 52. For this purpose, a method is employed in which a minor loop for controlling the speed of the motor-driven pump is formed in the engine speed control loop, so that the motor 23 is subjected to current control in the minor loop.

In the case where it is impossible to detect the speed of the motor-driven pump, a method may be employed in which the speed of the driving DC motor is calculated from its characteristic, and the calculation result is utilized as an amount of feedback to control the speed of the motor-driven pump. In this case, the response characteristic of the motor-driven pump can be improved.

The speed N of the motor can be determined from the following equation (2):

$$N = (V - rIa)/K \ldots \quad (2)$$

where V is the terminal voltage, Ia is the armature current, r is the sum of the armature resistance and the brush resistance, and K is the counter electromotive force of the motor.

A throttle sensor 42 operates to detect the position of a throttle lever 41 (FIG. 2) to output a corresponding position signal Es.

An engine speed sensor 40 operates to detect the speed of the engine 30, thereby to output a pulse signal Pn having a period proportional to the speed thus detected. A frequency-voltage converter 51 operates to output a voltage signal En corresponding to the frequency of the pulse signal Pn.

A PID compensation circuit 53 receives the difference between the signals Es and En as an input signal, and subjects the input signal to compensations such as proportion, integration and differentiation, thereby to output a motor speed instruction signal em corresponding to the difference input.

A voltage detecting circuit 61 in a motor speed detecting circuit 60 operates to detect the terminal voltage V of the motor 23, thereby to output a signal ev corresponding to the terminal voltage V thus detected. An armature current detecting circuit 62 operates to detect a voltage across a shunt resistor Rs connected to the current circuit of the motor 23, thereby to output a voltage signal ea corresponding to the actual armature current Ia. In a coefficient unit 63, the signal ea is multiplied by a coefficient r corresponding to the sum of the armature resistance and the brush resistance, so that a signal $ea'$ ($= r \cdot ea$) is outputted. In another coefficient unit 64, the difference (ev − ea′) between the signals ev and ea is divided by the counter electromotive force constant K, and the calculation represented by the equation (2) described above is carried out to obtain the speed N of the motor 23, as a result of which a corresponding speed signal en is outputted.

The function generator 52 is to set the speed of the motor-driven pump 21, i.e. the armature current Ia of the motor 23, at a speed Ne of the engine along a torque curve preset for the engine 30. The function generator 52 outputs an armature current setting signal Eas (FIG. 4) corresponding to an engine speed signal En.

A PID compensation circuit 54 compensates the difference between the motor speed instruction signal em and the actual motor speed signal en similarly as in the above-described PID compensation circuit 53, thereby to output it as a motor speed instruction signal Em.

An integrator 56 operates to integrate the difference between the maximum armature current setting signal Eas and the signal ea corresponding to the actual armature current Ia, thereby to provide an armature current instruction signal Ea.

Figure 5:
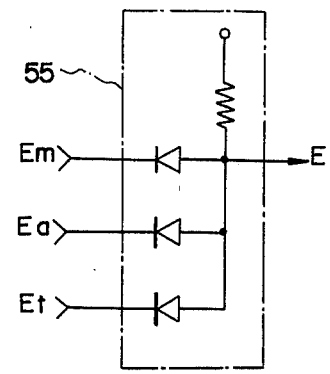
FIG. 5 is a circuit diagram showing one example of a minimum signal priority circuit in FIG. 3.

In a minimum signal priority circuit 55, among input signals applied thereto the minimum one is outputted in priority over the others. Thus, the smaller one of the instructions signals Em and Ea is outputted as an armature current instruction signal E by the minimum signal priority circuit 55. The minimum signal priority circuit 55 is arranged as shown in FIG. 5 for instance.

The instruction signal E thus outputted is amplified by an amplifier 57 and is then applied to the motor 23, to control the terminal voltage V of the motor 23. The armature current Ia of the motor 23 is varied according to the terminal voltage V. Thus, the motor 23 is rotated at a speed N corresponding to the terminal voltage V and the armature current Ia, to drive the pump 22.

When the signal ea exceeds the signal Eas, the output signal Ea of the integrator 56 is decreased. Accordingly, the minimum signal priority circuit 55 outputs the signal Ea in priority over the other signals no matter how large the motor speed instruction signal becomes. Therefore, the output voltage of the amplifier 57 is decreased, as a result of which the armature current is also decreased to be within a limited value.

The pump 22 supplies fuel, under a pressure P corresponding its speed, to the injectors 31a through 31d of the engine, and the engine is rotated according to the amount of fuel supplied to the injectors 31a through 31d.

Figure 6:
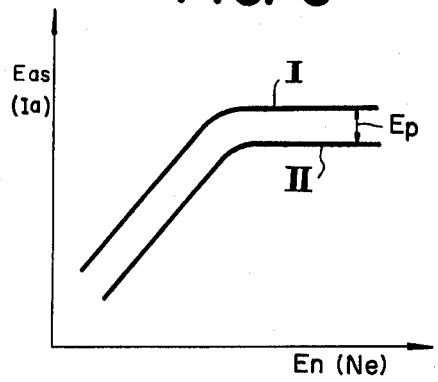
FIGS. 6, 7, 8 and 10 are graphical representations indicating various signals in the device in FIG. 3.

In quickly accelerating a diesel engine with a supercharger, the amount of suction air cannot follow the amount of jet fuel because the response of the supercharge is insufficient; that is, the amount of oxygen therein becomes short, as a result of which black smoke is discharged from the exhaust pipe. In order to overcome this difficulty, in the present invention, at the time of acceleration the amount of jet fuel is controlled so as to agree with the amount of suction air, thereby to prevent the production of black smoke. That is, a pressure switch 67 which is turned on when the suction air pressure is low and is turned off when it is high is provided in the intake manifold 32 of the engine, to control the output Ep of a black smoke preventing circuit 68, in such a manner that the output Ep is zero (0) when the pressure switch 67 is turned on, while it is (R2/R1+R2) when the switch 67 is turned off. The output Ep is added to the output signal Eas of the function generator 52, so that the signal Eas (FIG. 6, curve I) is shifted as much as the signal Ep (FIG. 6, curve II).

Thus, for the period of quick acceleration in which the suction air pressure is low, the amount of jet fule is reduced as much as the signal Ep, to prevent the production of black smoke.

Figure 12:
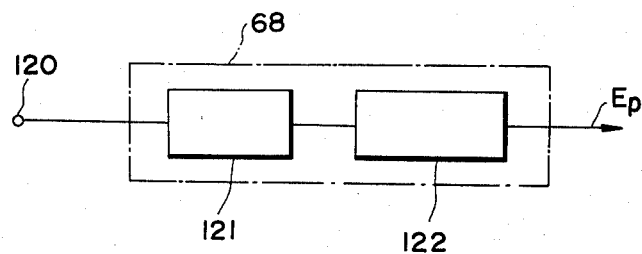
FIG. 12 is a block diagram illustrating one example of a black smoke preventing circuit using a pressure sensor.
Figure 13:
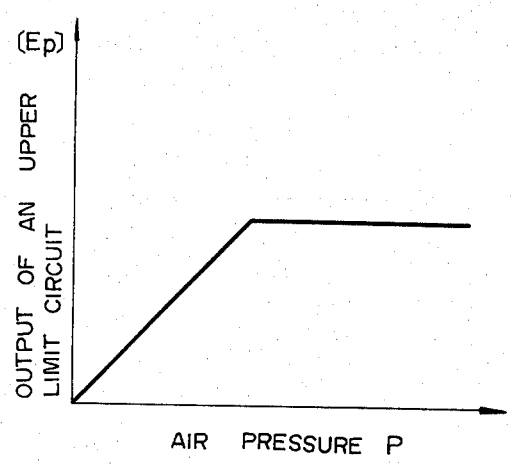
FIG. 13 is a graphical representation indicating the relation between the output of an upper limit circuit in FIG. 12 and the suction air pressure P.
Figure 14:
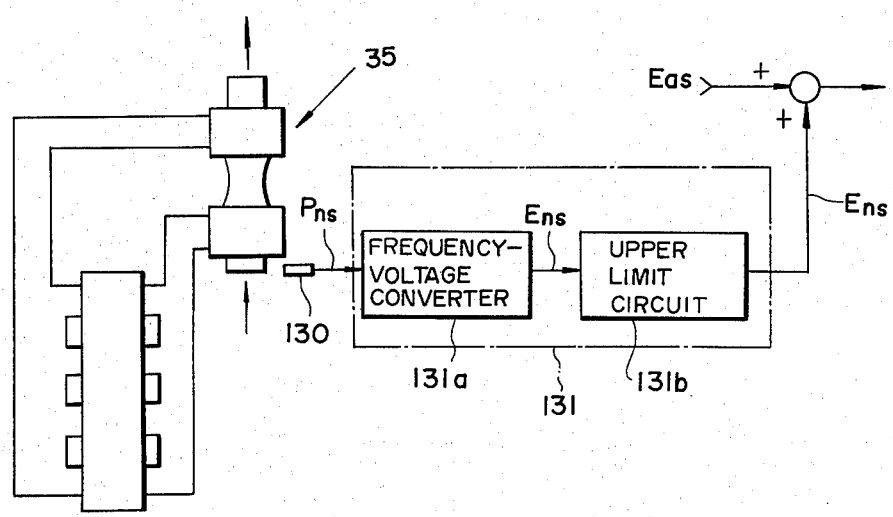
FIG. 14 is a block diagram illustrating another example of the black smoke preventing circuit.
Figure 15:
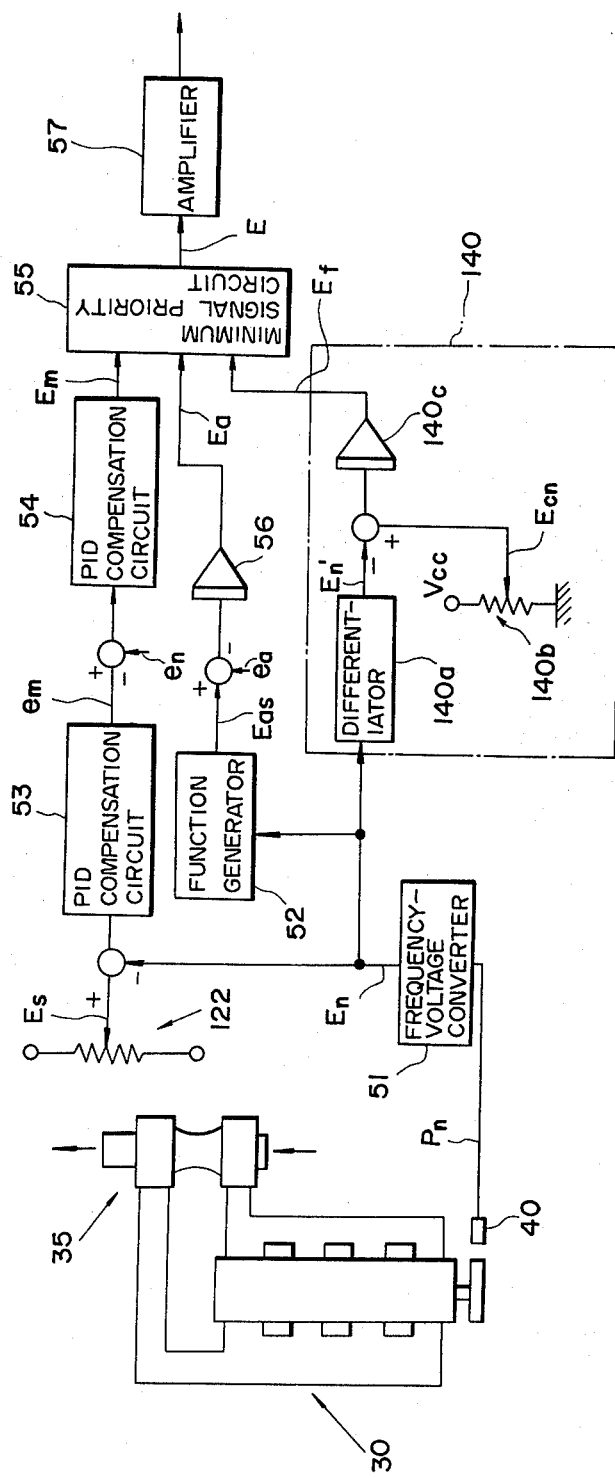
FIG. 15 is also a block diagram showing a third example of the black smoke preventing circuit.

The pressure switch 67 may be replaced by a pressure sensor. One example of a black smoke preventing circuit utilizing the pressure sensor is as shown in FIG. 12. Similarly as in the case of the pressure switch, the pressure sensor 120 is provided in the intake manifold. The output signal of the pressure sensor is applied though an amplifier 121 to an upper limit circuit 122 in the black smoke preventing circuit 68. The suction air pressure in the intake manifold is increased to a certain extent, the production of black smoke is suspended. Basing on this fact, the output voltage of the function generator 52 in FIG. 15 is decreased as much as a pressure in which black smoke is produced, by means of the upper limit circuit 122. This will become more apparent from a graphical representation in FIG. 13, which shows the relation between the suction air pressure and the output Ep of the upper limit circuit.

It is known in the art that when the density of air is low as experienced on an upland or the specific gravity of fuel is increased, the temperature of exhaust gas is increased if the amount of jet fuel is limited to the same value. If the temperature of exhaust gas is excessively high, the durability (or service life) of the engine is decreased. Accordingly, it is necessary to prevent the increase of the exhaust gas temperature to an allowable value.

In the invention, as shown in FIG. 3, an exhaust gas temperature sensor 71 such as a thermistor is provided in the exhaust manifold 33 of the engine 30, to output a signal et corresponding to an exhaust gas temperature. The signal et, after being amplified by an exhaust gas sensor amplifier 72 in an exhaust gas temperature compensation circuit 70, is compared with a value ET preset by an exhaust gas temperature maximal value setting unit 73, and the difference therebetween is applied to an integrator 74. The output signal Et of the integrator 74 is the armature current instruction signal of the motor, which is applied to the minimum signal priority circuit 55. When the signal et is larger than the signal ET, the signal Et is smallest. Therefore, the minimum signal priority circuit 55 outputs the signal Et in priority over the other signals, whereby the armature current Ia is limitted to decrease the pressure of the motor-driven pump 21 to decrease the amount of fuel jetted by the injectors 31a through 31d, thereby to decrease the exhaust gas temperaure.

If the engine is caused to produce a large output when the temperature of the cooling water is low, troubles that, for instance, the lubricant cannot be circulated sufficiently may be involved, because the engine is not, in its entirety, warmed up yet. Therefore, it is necessary to postpone the production of output of the engine.

Figure 7:
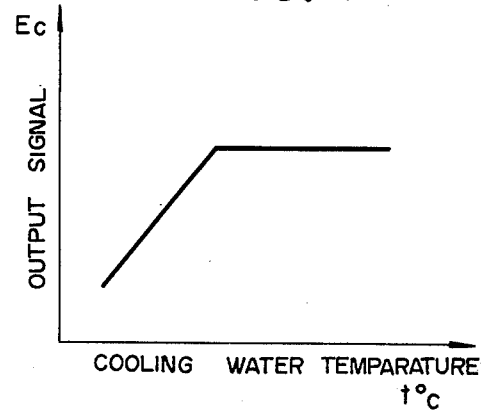
Figure 8:
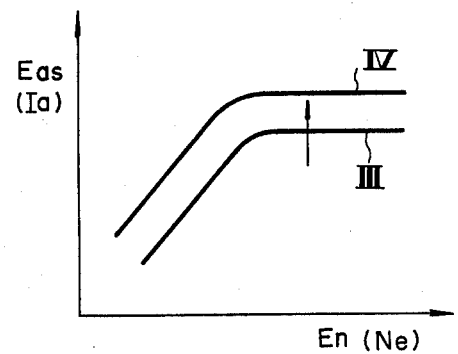

In order to satisfy this requirement, in the fuel control device, a water temperature sensor 80 such as a thermistor for measuring a cooling water temperature is provided in a cooling water path, as shown in FIG. 3, to output a signal ec corresponding to a water temperature. The signal ec is applied through a cooling water temperature sensor amplifier 82 to an upper limit circuit 83 in a cooling water temperature compensation circuit 81. The output signal Ec of the upper limit circuit 83 is changed with an increasing water temperature; however, the output signal Ec is maintained unchanged after the water temperature reaches a certain value ta, as shown in FIG. 7. The signal Ec is added to the output signal Eas of the function generator 52, so that the signal Eas (FIG. 8, curve III) is shifted (increased) as the water temperature is increased (FIG. 8, curve IV).

The reason why the upper limit is provided for the signal Ec is as follows: When the water temperature reaches the certain value ta or higher, no trouble is caused even if the engine is operated to provide its maximum output. In addition, it is undesirable that the engine output is affected by the variation of the water temperature after the water temperature has reached the predetermined value ta. Therefore, the signal Ec is limited to the constant value after the cooling water temperature has reached the predetermined value ta.

Figure 10:
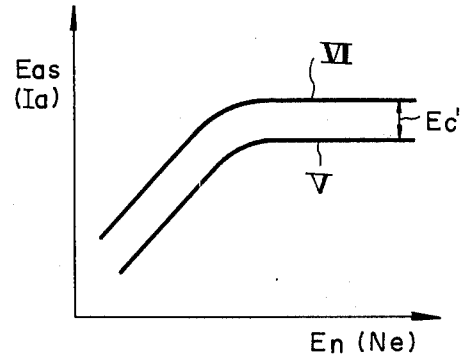
Figure 9:
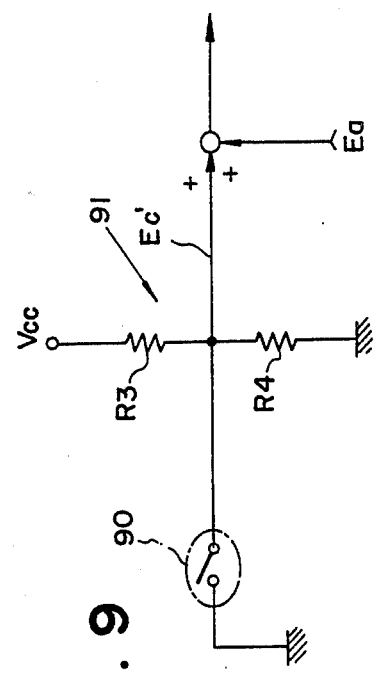
FIG. 9 is a circuit diagram showing another example of a cooling water temperature compensation circuit in FIG. 3.

The water temperature sensor 80 may be replaced by a temperature switch 90 as shown in FIG. 9. That is, the temperature switch 90 which is turned on when the water temperature is low, and is turned off when the water temperature is high is provided in the cooling water path, to control the output signal Ec' of a cooling water temperature compensation circuit 91. The output signal Ec' is zero (0) when the switch 90 is turned on, and is (R4/R3+R4)×Vcc when the switch 90 is turned off. Instead of the signal Ec, the signal Ec' is added to the output signal Eas of the function generator 52. When the water temperature is low, the temperature switch 90 is turned on, the set value Eas of the armature current is decreased as much as (R4/R3+R4)×Vcc (FIG. 10, curve V). When the water temperature is increased to turn on the temperature switch 90, the set value Eas is returned back to its steady set value (FIG. 10, curve VI). Thus, similarly as in the case of the cooling water temperature compensation circuit, the production of output of the engine can be postponed.

In the case where, instead of decreasing the pressure of fuel by limiting the armature current as described before, detecting the speed of the motor can be employed to limit the torque and horse power, the motor speed may be utilized to limit the pressure of fuel, basing on the fact that the amount of discharge fuel is in proportion to the speed of the pump.

Figure 11:
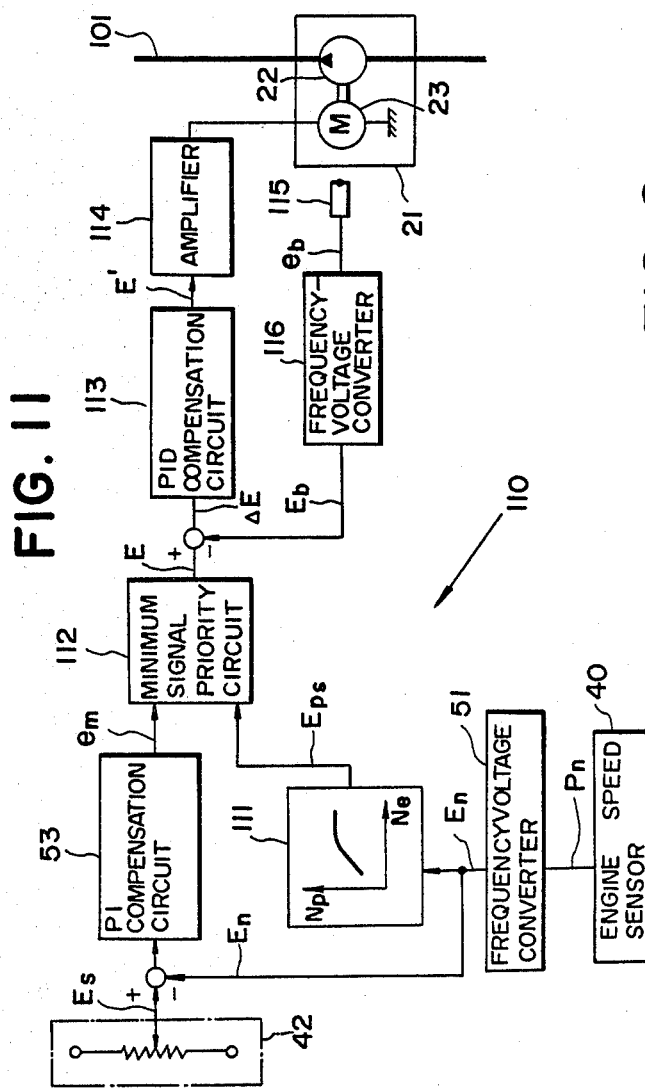
FIG. 11 is a block diagram showing the essential component of another example of the fuel control circuit according to the invention.

FIG. 11 shows another example of the fuel control device according to the invention, in which the pressure of fuel is limited according to the speed of the motor. Similarly as in the above-described first example, the output signal Pn of an engine speed sensor 40 is converted into a voltage signal En by means of a frequency-voltage converter 51. According to the signal En thus provided, a function generator 11 outputs a pump speed limit signal Eps corresponding to an engine speed Ne. A PID compensation circuit 53 outputs a motor-driven pump speed instruction signal em corresponding to the difference between the signal En and a position signal Es outputted by a throttle sensor 42. A minimum signal priority circuit 112 outputs as a motor-driven pump speed instruction signal E a smaller one of the signals em and Eps.

On the other hand, a motor speed sensor 115 detects an electric motor 23 in a motor-driven pump 21, to output a detection signal eb. The signal eb is converted into a voltage signal Eb by a frequency-voltage converter 16. A PID compensation circuit 113 outputs an instruction signal E' corresponding to the difference $\Delta E$ between the voltage signal Eb and the instruction signal E. The signal E', after being amplified by an amplifier 114, is applied to the motor 23, to control the speed of the latter 23.

A pump 22 is rotated in correspondence to the speed of the motor 23, to supply fuel under pressure to the injectors of the engine through a fuel supply pipe 101.

Even when the output em of the PID compensation circuit 53 in the engine speed control system exceeds the set value Eps of the function generator 111, the speed of the motor is never increased excessively because, in the minimum signal priority circuit, one lower in level of the two inputs is outputted in priority over the other.

The speed of the motor 23 is controlled to limit the pressure of fuel, as described above.

Figure 4:
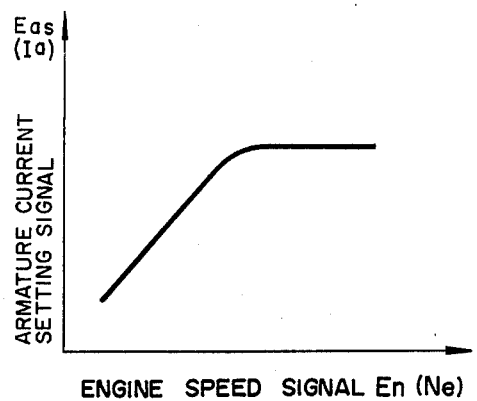
FIG. 4 is a graphical representation indicating one example of a characteristic of a function generator in FIG. 3.

FIG. 4 is an explanatory diagram showing the essential component of another example of the black smoke preventing device. In this example, instead of the suction air pressure, the speed of a supercharger 35 is detected by a pick-up 130 to provide a pulse signal Pns. The pulse signal Pns is converted into a voltage signal Ens by a frequency-voltage converter 131a in a black smoke preventing circuit 131. The signal Ens is applied through an upper limit circuit 131b similar to the above-described one to the function generator 52, so that it is added to the output signal Eas of the function generator 52. Thus, when the speed of the supercharger 35 is low, the signal Eas is decreased, and when the speed is high, the signal Eas is increased, similarly as in the above-described case.

A third example of the black smoke preventing device is as shown in FIG. 15. In this example, an engine speed signal En is subjected to differentiation by a differentiator 140a in a black smoke preventing circuit 140, to provide an acceleration signal E'n. The difference between the acceleration signal E'n and an acceleration signal Ecn set by an engine acceleration setting unit 140b is subjected to integration by an integrator 140c, to provide a signal Ef. The output signal Ef of the integrator 140c is applied to a minimum signal priority circuit 55. When the acceleration of the engine 30 exceeds the set acceleration, the signal E'n becomes smaller than the set value Ecn, and the output signal Ef of the integrator 140c becomes smaller. Therefore, the signal Ef is outputted in priority over the others by the minimum signal priority circuit 55. As a result, the armature current limit value is decreased, and the speed of the motor-driven pump is decreased, and the amount of jet fuel is reduced. That is, the production of black smoke is prevented at the time of acceleration.

Figure 16:
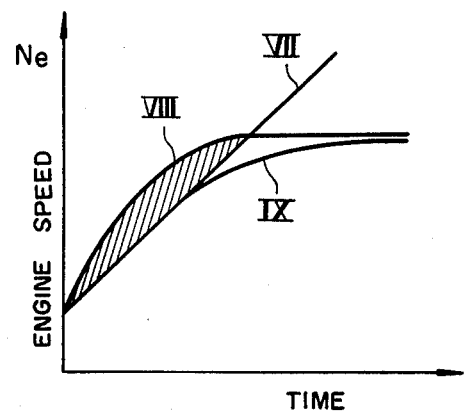
FIG. 16 is a graphical representation indicating acceleration characteristic of an engine.

FIG. 16 is a graphical representation indicating the acceleration characteristics of the engine. More specifically, (straight) line VII indicates the set acceleration characteristic of the engine, curve VIII indicates the acceleration characteristic in the case where the above-described differentiation limitation is not employed, and curve IX indicates the acceleration characteristic in the case where the differentiation limitation is employed. In FIG. 16, the hatched region is a region in which black smoke is generated when the engine acceleration exceeds the set acceleration. However, the employment of the differentiation limitation can prevent the production of black smoke because the engine acceleration will never exceed the set acceleration as is clear from curve IX.

Figure 17:
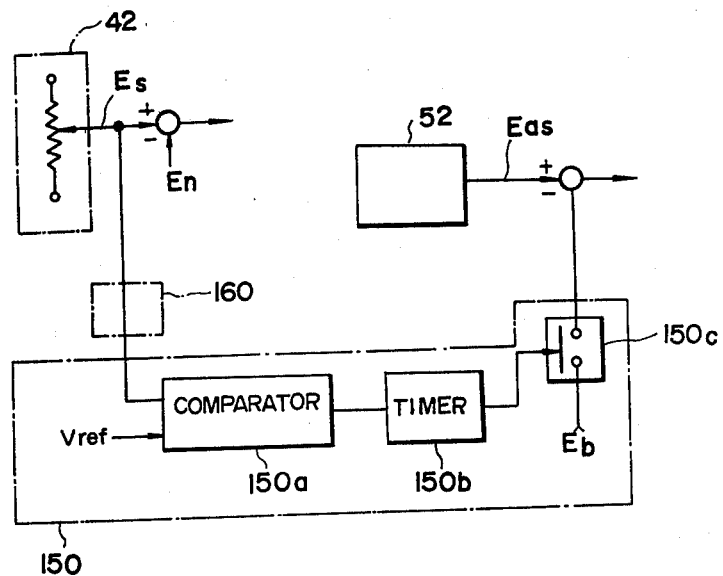
FIG. 17 is a block diagram showing a fourth example of the black smoke preventing circuit.

FIG. 17 shows another example of the black smoke preventing circuit. The output signal Es of a throttle sensor 42 is applied to a comparator 150a, where it is compared with a reference value Vref. When the signal Es exceeds the reference value Vref, the comparator 150a provides an output signal which is applied to a timer 150b. Upon reception of the output signal from the comparator 150a, the timer 150b closes contact means 150c for a predetermined period of time, for instance 2 to 4 seconds, as a result of which the output signal Eas of a function generator 52 is decreased as much as a value Eb. A differentiation circuit 160 for differentiating the output of the throttle sensor 42 may be provided as indicated by the dotted line in FIG. 17, so that the production of black smoke is prevented when the acceleration of throttle exceeds a predetermined value.

Figure 18:
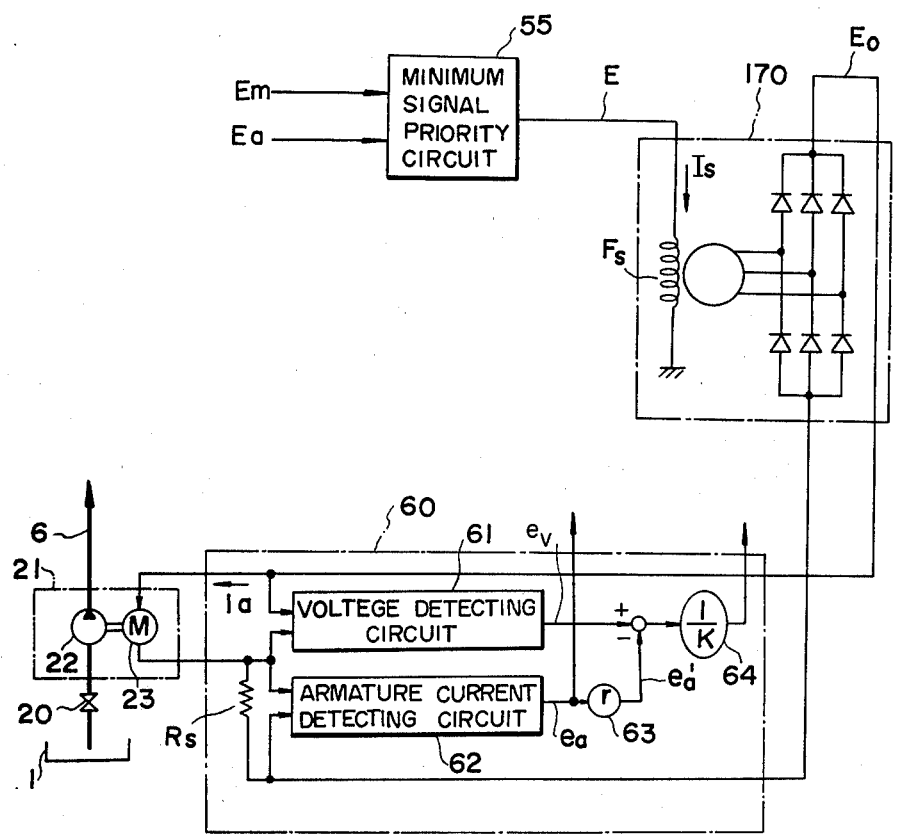
FIG. 18 is a block diagram showing a part of a third example of the fuel control device according to the invention.
Figure 19:
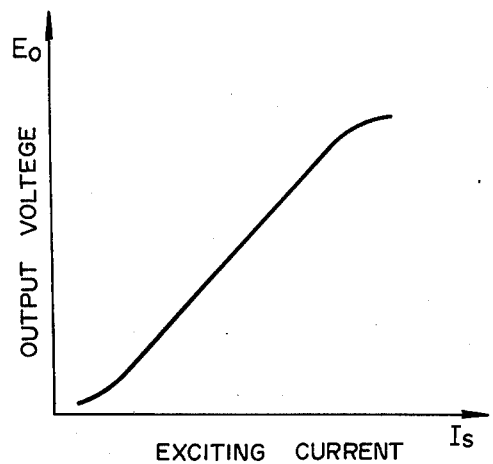
FIG. 19 is a graphical representation indicating the output voltage characteristic of an alternator.

Another example of the fuel control device according to the invention is as shown in FIG. 18, in which an alternator 170 is interposed between a minimum signal priority circuit 55 and a motor 23. The output of the minimum signal priority circuit 55 is applied to the exciting coil Fs of the alternator 170. The resistance of the exciting coil Fs is constant. Therefore, an exciting current Is flowing in the exciting coil Fs varies with the voltage of an armature current instruction signal E from the minimum signal priority circuit 55. The alternator 170 is driven by the engine 30. The output voltage EO of the alternator 170 is applied to the motor 23 in a motor-driven pump 22. Since the output voltage EO varies in proportion with the exciting current Is (FIG. 19), the armature current Ia of the pump 22 varies with the voltage EO. The motor 23 is rotated at a speed corresponding to the armature current Ia, to drive the pump 22, to supply fuel to the injectors 31a through 31d of the engine.

The exciting current Is applied to the alternator 170 may be small. Accordingly, the alternator 170 can be operated sufficiently by the armature current instruction signal E outputted by the minimum signal priority circuit 55. The use of the alternator makes it possible to control the motor with such a small exciting current, and therefore the control device can be miniaturized as much.

In the above-described examples, the pump is controlled by the electric motor. However, the amount of jet fuel may be controlled by the following method: The engine is coupled through an electromagnetic coupling to the fuel jetting pump. The exciting current of the electromagnetic coupling is changed to control the transmission torque, thereby to control the amount of jet fuel. One example of this is as shown in FIG. 20.

Figure 20:
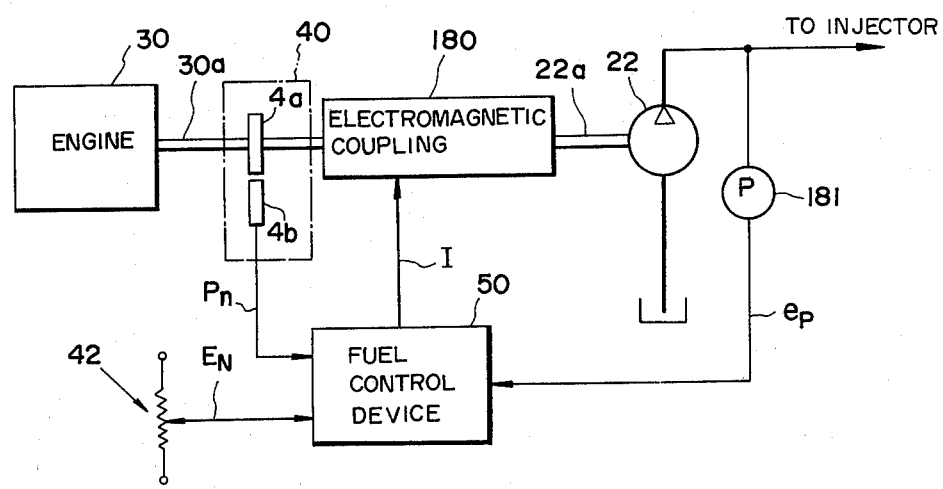
FIG. 20 is a block diagram illustrating a fourth example of the fuel control device according to the invention.

In FIG. 20, the output shaft 30a of an engine 30 is coupled through an electromagnetic coupling 180 to the input shaft of a fuel pump 22. The exciting current I of the electromagnetic coupling 180 is changed to control the transmission torque from the engine 30 to the pump 22, thereby to control the discharge pressure P of the pump 22. A speed detector (tachometer) 40 is provided on the output shaft 30a of the engine 30. The speed detector 40 comprises: a gear 4a fixedly mounted on the output shaft 30a; and a pickup coil 4b for detecting the teeth of the gear, to output a pulse signal Pn having a period corresponding to the speed of the engine. In FIG. 20, reference character EN designates the output of a throttle sensor.

A pressure sensor 181 is inserted in a hydraulic pressure circuit between the discharge side of the fuel pump 22 and the injectors 31a through 31d (FIG. 3), to detect the discharge pressure P of the pump 22, thereby to output a pressure signal ep. These signals Pn, EN, ep are applied to a control circuit 50, which outputs an exciting current I according to the input signals. The exciting current I is applied to the electromagnetic coupling 180, to control the electromagnetic force of the latter 180. In the control circuit 50, the output ep of the pressure sensor is subtracted from the output E of the minimum signal priority circuit 55 in FIGS. 3, 11.

As the electromagnetic force of the electromagnetic coupling 180 changes, the torque transmitted from the engine 30 to the pump 22 is changed. As a result, the pump 22 supplies fuel to the injectors, under a pressure corresponding to its speed.

As is clear from the above description, the use of the electromagnetic coupling makes it possible to simplify the arrangement of the fuel control device and to reduce the size of the fuel control device.

What is claimed is:

1. A fuel control device for a diesel engine of unit injection system, which comprises:
    a motor-driven pump for supplying fuel to the injectors of said engine by driving a fuel pump with a DC motor;
    means for outputting a first motor-driven pump speed instruction signal according to a throttle position and an engine speed;
    a function generator for outputting a motor-driven pump armature current setting signal according to an engine speed along a torque curve preset for said engine;
    a motor speed detecting circuit for detecting an armature current of said motor-driven pump, to output an armature current signal;
    an integrator for integrating a difference between said armature current setting signal and an actual armature current signal, to output a second motor-driven pump speed instruction signal; and
    a minimum signal priority circuit for outputting a smaller one of said first and second instruction signals in priority, to control the armature current, whereby the speed of said motor-driven pump is regulated according to an engine speed, for torque regulation of the engine.

2. A device as claimed in claim 1, which further comprises:
    an exhaust gas temperature compensation circuit having an exhaust gas temperature sensor provided in the exhaust manifold of said engine, and operating when an output of said sensor exceeds a predetermined value, to output a third motor-driven pump speed instruction signal, and
    in which said minimum signal priority circuit operates to output the smallest one of said first, second and third instruction signals in priority over the others, to regulate said armature current,
    whereby, when the exhaust gas temperature of said engine exceeds a predetermined value, the armature current of said motor-driven pump is regulated until said exhaust gas temperature reaches said predetermined value, thereby to reduce the amount of jet fuel.

3. A device as claimed in claim 1, which further comprises:
    a cooling water temperature compensation circuit having a cooling water temperature sensor adapted to detect a cooling water temperature to provide a detection signal, for changing a set value of said armature current setting signal according to said detection signal,
    whereby, when said engine is at a low temperature, the armature current of said motor-driven pump is regulated to reduce the amount of jet fuel, thereby to reduce the output of said engine.

4. A device as claimed in claim 1, which further comprises:
    means having a pressure sensor adapted to detect a pressure in the intake manifold of said engine to provide a detection signal, for changing a set value of said armature current setting signal according to said detection signal,
    whereby when the pressure in said intake manifold is low, the armature current of said motor-driven pump is regulated, to reduce the amount of jet fuel.

5. A device as claimed in claim 1, which further comprises:
    means for detecting a speed of a supercharger to change a set value of said armature current setting signal according to said speed thus detected,
    whereby when the speed of said supercharger is low, the armature current of said motor-driven pump is regulated, to reduce the amount of jet fuel.

6. A device as claimed in claim 1, which further comprises:
    means for differentiating an engine speed to provide an acceleration signal and integrating a difference said acceleration signal and a preset value to output said difference thus integrated as a third motor-driven pump speed instruction signal, and
    in which said minimum signal priority circuit operates to output the smallest one of said first, second and third instructions in priority over the others,
    whereby at the time of quick acceleration the armature current of said motor-driven pump is regulated to reduce the amount of jet fuel.

7. A device as claimed in claim 1, which further comprises: means which, when a throttle position signal exceeds a predetermined value, operates for a predetermined period of time to decrease said armature current setting signal by a predetermined value.

8. A device as claimed in claim 1, which further comprises: means for differentiating a throttle position signal to provide a throttle acceleration signal and for operating, when said acceleration signal exceeds a predetermined value, for a predetermined period of time to decrease said armature current setting signal by a predetermined value.

9. A fuel control device for controlling the fuel supplied to the fuel injectors of a diesel engine having a throttle control, which comprises:
    a pump for supplying fuel to the injectors;
    a motor for driving the fuel pump;
    a first sensor for sensing the diesel engine speed and providing a signal indicative of the engine speed;

a second sensor for sensing the position of the throttle and providing a signal indicative of the throttle position;

a first compensation means responsive to the engine speed sensor and throttle position sensor, for outputting a first pump motor speed instruction signal in accordance with the difference between the throttle position and engine speed signals;

a third sensor for sensing an electrical parameter of the pump motor operation, and providing a signal indicative of the amount of fuel being supplied by the pump;

a function generator responsive to the engine speed sensor, for outputting a second pump motor speed instruction signal corresponding to a particular engine speed in accordance with a predetermined torque curve for the engine;

second compensation means, responsive to the function generator and the third sensor, for compensating the second pump motor speed instruction signal in accordance with the difference between the second pump motor speed instruction signal and the fuel amount signal; and a minimum signal priority circuit operably connected to the first and second compensation means, for outputting the smaller of the first and second pump motor speed instruction signals to the pump motor;

whereby the amount of fuel supplied to the injectors is regulated in accordance with the engine torque curve, the actual fuel being supplied, the throttle position and the engine speed.

10. The fuel control device of claim 9 further comprising:

a fourth sensor for sensing the pump motor speed and providing a signal indicative of the pump motor speed; and a third compensation means, responsive to the first compensation means and the fourth sensor, for compensating the first pump motor speed instruction signal in accordance with the difference between the first pump motor speed instruction signal and the actual pump motor speed signal;

whereby the fuel supplied to the injectors is also regulated in accordance with the pump motor speed.

11. The fuel control device of claim 10, wherein the pump motor has an armature and the pump motor speed is a function of the pump motor armature current and terminal voltage, said fourth sensor for sensing the pump motor speed having means for sensing the pump motor armature current and terminal voltage.

12. The fuel control device of claim 1 further comprising means responsive to the first sensor, for differentiating the engine speed signal to provide an acceleration signal, for integrating the difference between the acceleration signal and a predetermined reference value and for outputting the integrated difference as a third pump motor speed instruction signal; and said minimum signal priority circuitry further being responsive to the differentiating means and having means to output the smallest of the first, second and third pump motor speed instructions in priority over the other instructions, whereby at the time of quick acceleration exceeding the predetermined reference value, the pump motor speed is regulated to reduce the amount of fuel supplied to the injector.

13. The fuel control device of claim 9 further comprising an alternator operably driven by the engine and having an excitation coil operably connected to the minimum signal priority circuit wherein the outputted pump motor speed instruction signal excites the coil and the alternator produces an output voltage for driving the pump motor in accordance with the pump motor speed instruction signal.

14. The device of claim 11 further comprising means responsive to the minimum signal priority circuit for controlling the pump motor armature current in accordance with the pump motor speed instruction signals.

15. The fuel control device of claim 9 wherein the diesel engine has an intake manifold, the device further comprising a pressure sensor for sensing the intake manifold pressure and means responsive to the pressure sensor for reducing the second pump motor speed instruction signal of the function generator when the intake manifold pressure is low.

16. The fuel control device of claim 9 wherein the diesel engine has an exhaust manifold, the device further comprising an exhaust gas temperature sensor for sensing the exhaust manifold gas temperature and means responsive to the exhaust gas sensor for outputting a third pump motor speed instruction signal when the exhaust gas temperature exceeds a predetermined value, said minimum signal priority circuit being operably connected to the third pump motor speed instruction means wherein the minimum signal priority circuit operates to output the smallest one of said first, second and third instruction signals in priority over the others, wherein the speed of the pump motor is regulated by the third pump motor speed instruction means when the exhaust gas temperature exceeds the predetermined value.

17. The fuel control device of claim 9 wherein the diesel engine is fluid cooled, the device further comprising a cooling fluid temperature sensor for sensing the temperature of the cooling fluid and means responsive to the cooling fluid temperature sensor for reducing the second pump motor speed instruction signal of the function generator when the cooling fluid temperature is below a predetermined value.

18. The fuel control device of claim 9 wherein the diesel engine has a supercharger, the device further comprising a supercharger sensor for sensing the speed of the supercharger and means responsive to the supercharger sensor for modifying the second pump motor speed instruction signal of the function generator in accordance with the speed of the turbor charger.

19. The fuel control device of claim 9 further comprising means responsive to the first sensor for sensing the diesel engine speed, for outputting a fifth pump motor speed instruction signal in accordance with the acceleration of the diesel engine, and the minimum signal priority circuit being operably connected to the fifth pump motor speed instruction signal means to output the minimum pump motor speed instruction signal to the pump motor;

wherein the acceleration of the diesel engine does not exceed a predetermined value.

20. The fuel control device of claim 9 further comprising a timer means for timing a predetermined period of time and means responsive to the second sensor for sensing the position of the throttle for reducing the second pump motor speed instruction signal of the function generator for the predetermined period of time when the position of the throttle exceeds a predetermined value.

21. The fuel device of claim 9 wherein the pump motor has an armature, the third sensor for sensing an electrical parameter of the pump motor operation having means for sensing the pump motor armature current and the second pump motor speed instruction signal is in the form of a pump motor armature current setting signal.

22. A fuel control device for controlling the pressure of fuel supplied to the fuel injectors of a diesel engine having a throttle control, which comprises:
- a pump for supplying fuel to the injectors;
- a motor for driving the fuel pump;
- a first sensor for sensing the diesel engine speed and providing a signal indicative of the engine speed;
- a second sensor for sensing the position of the throttle and providing a signal indicative of the throttle position;
- a first compensation means responsive to the engine speed sensor and throttle position sensor, for outputting a first pump motor speed instruction signal to the pump motor to compensate the engine speed in accordance with the difference between the throttle position and engine speed signals;
- a third sensor for sensing the pump motor speed and providing a signal indicative of the pump motor speed; and
- a second compensation means, responsive to the first compensation means and the third sensor, for compensating the first pump motor speed instruction signal in accordance with the difference between the first pump motor speed instruction signal and the actual pump motor speed signal;
- wherein the pump motor has an armature and the pump motor speed is a function of the pump motor armature current, said third sensor for sensing the pump motor speed having means for sensing the pump motor armature current and for providing a signal indicative of the armature current;
- whereby the fuel pressure supplied to the injectors is regulated in accordance with the throttle position, engine speed and pump motor speed.

23. A fuel control device for controlling the fuel supplied to the fuel injectors of a diesel engine comprising:
- a pump for supplying fuel to the injectors;
- a motor for driving the fuel pump;
- a sensor for sensing an electrical parameter of the pump motor operation and providing a signal indicative of the amount of fuel being supplied by the pump;
- a function generator responsive to the engine speed sensor, for outputting a pump motor speed instruction signal corresponding to a particular engine speed in accordance with a predetermined torque curve for the engine; and
- compensation means, responsive to the function generator and the sensor, for compensating the pump motor speed instruction signal in accordance with the difference between the pump motor speed instruction signal and the fuel amount signal;
- wherein the amount of fuel supplied to the injectors can be regulated in accordance with the engine torque curve and the actual amount of fuel being supplied.

* * * * *

UNITED STATES PATENT AND TRADEMARK OFFICE
CERTIFICATE OF CORRECTION

PATENT NO. : 4,359,984

DATED : November 23, 1982

INVENTOR(S) : Kiyoharu Nakao

It is certified that error appears in the above-identified patent and that said Letters Patent is hereby corrected as shown below:

On the title page Insert

--(73) Assignee: Kabushiki Kaisha Komatsu Seisakusho, Tokyo-to, Japan. --

Signed and Sealed this

Seventh Day of June 1983

[SEAL]

*Attest:*

DONALD J. QUIGG

*Attesting Officer*     *Acting Commissioner of Patents and Trademarks*